Patented July 23, 1946

2,404,695

UNITED STATES PATENT OFFICE 2,404,695

MANUFACTURE OF ARYL SULPHENAMIDES

Ralph A. Coleman, Naugatuck, Conn., assignor to United States Rubber Company, New York, N. Y., a corporation of New Jersey No Drawing. Application August 31, 1944, Serial No. 552,197

1 Claim. (Cl. 260—551)

This invention relates to the manufacture of aryl sulphenamides of the formula aryl—S—NH$_2$, where aryl is an aromatic nucleus of the benzene or naphthalene series, which nucleus is further substituted by an electro-negative group.

Examples of such electro-negative groups include halogen (Cl, Br, I), nitro, acyl, carboxyl, sulphonamide (—SO$_2$.NH$_2$), carboxyl amido (—CO—NH$_2$), nitroalkylene (e. g. —CH$_2$.NO$_2$), etc. The electro-negative group acts to stabilize the chemical against decomposition.

I have discovered that such aryl sulphenamides can be prepared from reacting, on the corresponding aryl mercaptan (having the said electro-negative attached to aryl), usually in the form of its water-soluble alkali-metal salt, with monochloramine (NH$_2$.Cl), in aqueous solution.

This reaction does not work for preparing all aryl sulphenamides, for example, thiophenol or its salt on treatment with monochloramine is oxidized to diphenyl disulfide.

The general formula for the mercaptan to be employed for the purposes of this invention is illustrated by

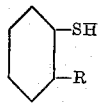

where R is the stabilizing electro-negative group, further examples of which are carbonyl, as in p-mercapto acetophenone

and carboxy ester, as in p-mercapto ethyl benzoate

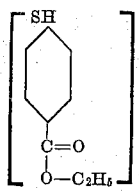

The reaction may be carried out in water solution by mixing an aqueous solution of monochloramine and an aqueous solution of the mercaptan. It is advisable to keep the temperature below 30° C. and to mix the solution at a moderate rate. At least one stoichiometric proportion of monochloramine per mol of mercaptan should be used. Adequate ventilation for monochloramine vapor should be provided.

Whether the monochloramine solution is added to the aryl mercaptide solution or vice versa is immaterial although the former is preferred.

EXAMPLE 1.—O-NITRO PHENYL SULPHENAMIDE

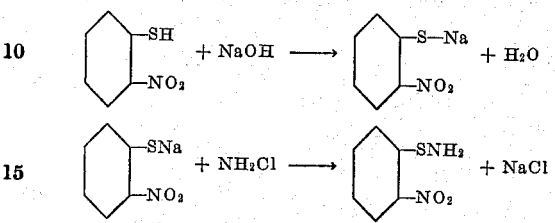

Sodium o-nitro phenyl mercaptide

A solution of 18.1 g. o-nitro thiophenol in 340 cc. cold water containing 4.6 g. sodium hydroxide is prepared. Any disulphide due to air oxidation of the alkaline solution is removed by filtration.

*Monochloramine*

A sodium hypochlorite solution is prepared by dissolving 8.16 g. chlorine in a solution of 10.0 g. sodium hydroxide in 56 cc. water and 95 g. ice. This solution should be slightly alkaline; if not, more sodium hydroxide should be added until it is alkaline. To this sodium hypochlorite solution, a solution of 14.6 cc. 28% ammonium hydroxide in 410 cc. of ice and water are added with good stirring. The formation of monochloramine is rapid and the solution is ready for use a short time after its preparation. It is solution B. Ice should be present at all times.

The monochloramine solution B is added rapidly to the sodium o-nitro phenyl mercaptide solution with stirring. A flocculent yellow solid precipitates which is filtered off, washed with water and dried. Yield 7.7 g. o-nitro phenyl sulphenamide melting 120–124° C.

EXAMPLE 2.—P-NITRO PHENYL SULPHENAMIDE

A damp filter cake of sodium p-nitro phenyl mercaptide (24 g.) is dissolved in 225 cc. water.

A solution of monochloramine is prepared from

| | |
|---|---|
| Chlorine _____ g__ | 71.1 |
| Sodium hydroxide _____ g__ | 8.4 |
| Ice and water _____ cc__ | 133 |
| 28% ammonium hydroxide _____ cc__ | 12.9 |
| Ice water _____ cc__ | 375 | as described in Example 1.

The monochloramine solution is then poured rapidly into the sodium p-nitro phenyl mercaptide solution. A yellow solid precipitates which is filtered, washed with water and dried. A yield of 5.2 g. p-nitrophenyl sulphenamide melting 99–103° C. is obtained.

EXAMPLE 3.—2,5-DICHLORO PHENYL SULPHENAMIDE 2,5-dichloro thiophenol (22.8 g.) is dissolved in a solution of 5.1 g. sodium hydroxide in 110 cc. water. A small amount of insoluble material is removed by filtration, then 25 cc. water is added to the filtrate.

The monochloramine solution is prepared from

| | |
|---|---|
| Chlorine _____ g__ | 9.05 |
| Sodium hydroxide _____ g__ | 11.2 |
| Ice and water _____ cc__ | 128 |
| 28% ammonium hydroxide _____ cc__ | 16.5 |
| Ice and water _____ cc__ | 159 | as described in Example 1.

The monochloramine solution is added rapidly to the sodium 2,5-dichloro phenyl mercaptide solution. In a short time a white solid precipitates which is filtered off, washed with water and dried. A yield of 22.3 g. of 2,5-dichloro phenyl sulphenamide melting 62–63° C. is obtained.

Examples of other sulphenamides which may be similarly prepared are 2,4-dinitro phenyl sulphenamide, anthraquinone - 2-sulphenamide, 2-nitro-4-chlorobenzene sulphenamide, 4-benzoyl benzene sulphenamide, 4-(benzene sulphonyl) benzene sulphenamide, and 4-acetyl benzene sulphenamide.

Having thus described my invention, what I claim and desire to protect by Letters Patent is:

As a new compound 2,5-dichloro phenyl sulphenamide.

RALPH A. COLEMAN.